US011937573B2

(12) United States Patent
Tai et al.

(10) Patent No.: US 11,937,573 B2
(45) Date of Patent: Mar. 26, 2024

(54) MUSIC PROVIDING SYSTEM FOR NON-HUMAN ANIMAL

(71) Applicant: MEC COMPANY LTD., Amagasaki (JP)

(72) Inventors: Kiyoto Tai, Amagasaki (JP); Yuji Adachi, Amagasaki (JP); Hideshi Hamaguchi, Los Angeles, CA (US)

(73) Assignee: MEC COMPANY LTD., Amagasaki (JP)

( * ) Notice: Subject to any disclaimer, the term of this patent is extended or adjusted under 35 U.S.C. 154(b) by 580 days.

(21) Appl. No.: 17/260,510

(22) PCT Filed: Jun. 27, 2019

(86) PCT No.: PCT/JP2019/025613
§ 371 (c)(1),
(2) Date: Jan. 14, 2021

(87) PCT Pub. No.: WO2020/017273
PCT Pub. Date: Jan. 23, 2020

(65) Prior Publication Data
US 2021/0267168 A1    Sep. 2, 2021

(30) Foreign Application Priority Data

Jul. 20, 2018   (JP) ................. 2018-136877

(51) Int. Cl.
*A01K 15/02*    (2006.01)
*A01K 29/00*    (2006.01)
(Continued)

(52) U.S. Cl.
CPC .......... *A01K 15/021* (2013.01); *A01K 29/005* (2013.01); *G06F 3/165* (2013.01);
(Continued)

(58) Field of Classification Search
CPC .. A01K 15/021; A01K 15/022; A01K 15/023; A01K 29/005; G06V 40/20;
(Continued)

(56) References Cited

U.S. PATENT DOCUMENTS

2012/0206454 A1* 8/2012 Alasaarela ............. A01K 29/00
345/419
2014/0233906 A1    8/2014 Neskin et al.
(Continued)

FOREIGN PATENT DOCUMENTS

JP    2002-058378 A    2/2002
JP    2005-40402 A     2/2005
(Continued)

OTHER PUBLICATIONS

International Search Report for International Application No. PCT/JP2019/025613, dated Sep. 24, 2019 in 2 pages.
(Continued)

*Primary Examiner* — Antim G Shah
*Assistant Examiner* — Sabrina Diaz
(74) *Attorney, Agent, or Firm* — Knobbe, Martens, Olson & Bear, LLP

(57) ABSTRACT

In order to achieve a music providing system capable of controlling the behavioral state of a non-human animal using music, this music providing system for a non-human animal is provided with: a state information acquisition unit for acquiring state information relating to the motion state of an animal of interest; a state estimation processing unit for estimating the current behavioral state of the animal of interest from the state information; a target state storage unit for storing information relating to a target behavioral state for the animal of interest; a sound source storage unit for storing multiple music information pieces; a music information selection unit for detecting the degree of divergence
(Continued)

of the current behavioral state from the target behavioral state and selecting one specific music information piece on the basis of the multiple music information pieces stored in the sound source storage unit; and a music information output unit for outputting the specific music information by wireless communication or wired communication to a speaker provided within a region in which the animal of interest is present. The music information selection unit performs the processing for selecting a different specific music information piece until the degree of divergence becomes a first threshold value or less.

10 Claims, 9 Drawing Sheets

(51) Int. Cl.
  *G06F 3/16* (2006.01)
  *G06V 40/20* (2022.01)
  *H04R 3/00* (2006.01)
(52) U.S. Cl.
  CPC .............. *G06V 40/20* (2022.01); *H04R 3/00* (2013.01); *H04R 2420/07* (2013.01)
(58) Field of Classification Search
  CPC .. H04R 2499/10; H04R 3/00; H04R 2420/07; H04R 29/00; G06F 3/165
  USPC ..................................................... 381/56, 61
  See application file for complete search history.

(56) References Cited

U.S. PATENT DOCUMENTS

| | | | | |
|---|---|---|---|---|
| 2015/0327514 | A1* | 11/2015 | Clark | A01K 5/02 119/57.92 |
| 2016/0021506 | A1* | 1/2016 | Bonge, Jr. | H04W 4/027 717/173 |
| 2017/0097169 | A1* | 4/2017 | Azevedo | G05B 15/02 |
| 2017/0223928 | A1* | 8/2017 | Davino | H04N 7/155 |
| 2019/0069510 | A1* | 3/2019 | Otero | H04R 1/028 |

FOREIGN PATENT DOCUMENTS

| | | | | |
|---|---|---|---|---|
| JP | 2009-225704 A | | 10/2009 | |
| JP | 2016-42870 A | | 4/2016 | |
| JP | 2017-223812 A | | 12/2017 | |
| KR | 2017098621 A | * | 8/2017 | .............. B25J 11/00 |
| KR | 2018015363 A | * | 2/2018 | ............. A01K 15/00 |
| WO | 2017/155287 A1 | | 9/2017 | |

OTHER PUBLICATIONS

Extended European Search Report issued for European Patent Application No. 19838043.8, dated Jul. 21, 2021 in 8 pages.
International Preliminary Report on Patentability for International Patent Application No. PCT/JP2019/025613, dated Jan. 26, 2021 in 6 pages.

* cited by examiner

MUSIC PROVIDING SYSTEM FOR NON-HUMAN ANIMAL

CROSS-REFERENCE TO RELATED APPLICATIONS

This application is the U.S. National Phase under 35. U.S.C. § 371 of International Application PCT/JP2019/025613, filed Jun. 27, 2019, which claims priority to Japanese Patent Application No. 2018-136877, filed Jul. 20, 2018. The disclosures of the above-described applications are hereby incorporated by reference in their entirety.

TECHNICAL FIELD

The present invention relates to a music providing system for a non-human animal.

BACKGROUND ART

It is sometimes the case with a pet owner, particularly when out of the house, to wonder how the pet is behaving. A technique for remotely monitoring a pet is known before, wherein a web camera and a microphone are attached near the pet while an IC chip is attached to the pet (see, for example, Patent Document 1).

PRIOR ART DOCUMENT

Patent Document

Patent Document 1: JP-A-2002-058378

SUMMARY OF THE INVENTION

Problems to be Solved by the Invention

The main purpose of the technique described in Patent Document 1 is to check up on the current state of the pet that is in a remote location. Therefore, if the pet is barking restlessly and continuously, for example, this technique hardly provides good enough service for the pet owner, because the pet owner, while being worried all the time, can do nothing but check the state of the pet.

Meanwhile, pet healing CDs for popular pets such as dogs and cats are commercially available. Therefore, when the pet owner who has realized the state of the pet that is barking restlessly and continuously, for example, by the technique of the Patent Document 1 mentioned above, it is possible for the pet owner to obtain an effect of calming down the pet to some extent by remotely playing one of the healing CDs mentioned above.

While these healing CDs are generally supposed to have some effect, the effect depends on individual pets. Namely, while some healing effect may be observed for a pet a of a pet owner A, it may as well be that hardly any healing effect is observed for a pet b of another pet owner B.

Various types of music are commercially available in the form of pet healing CDs. Therefore, pet owners need to purchase and test multiple pieces of music in order to ascertain which piece of music has the effect of calming down the pet they keep. It is hardly realistic for a pet owner to do this work from the viewpoints of time and cost.

Moreover, a method of remotely calming down not only pets, but also livestock such as cows, horses, pigs, and chickens, animals kept in zoos, or rescued mammals, similarly to pets, is desirable, since it is difficult for animal keepers to stay near the animal stalls all the time.

In view of the issue described above, it is an object of the present invention to realize a music providing system that allows for control of the behavioral state of non-human animals using music.

Means for Solving the Problems

The music providing system for a non-human animal according to the present invention includes:
  a state information acquisition unit that acquires state information relating to a motion state of a target animal that is a non-human animal,
  a state estimation processing unit that estimates, from the state information, a current behavioral state that is a behavioral state of the target animal at a current moment by arithmetic processing;
  a target state storage unit that stores information relating to a target behavioral state that is a behavioral state aimed to be achieved of the target animal;
  a sound source storage unit that stores a plurality of pieces of music information;
  a music information selecting unit that detects a degree of divergence of the current behavioral state from the target behavioral state by arithmetic processing, and selects a piece of specific music information based on the plurality of pieces of music information stored in the sound source storage unit by arithmetic processing; and
  a music information output unit that outputs the specific music information to a speaker provided within a region where the target animal is present via wireless or wired communication,
  wherein the music information selecting unit carries out a process of selecting a different piece of the specific music information until the degree of divergence becomes equal to or less than a predetermined first threshold.

The music providing system for a non-human animal is configured such that the music information selecting unit selects a piece of specific music information from the sound source storage unit in accordance with a degree of divergence of a current behavioral state estimated from state information relating to a motion state of a target animal from a target behavioral state that is a behavioral state aimed to be achieved. This selected specific music information is output from the speaker and input to the ears of the target animal as an auditory signal.

Possible target animals include pets, livestock, animals kept in zoos, rescued animals and the like. Mammals and birds are conceivable as these animals. More specifically, dogs, cats, rabbits, birds, cows, pigs, chickens, horses and the like are conceivable. Preferably the animal is a dog.

When the specific music information is a piece of music that has some psychological effect on the target animal, the target animal changes its behavioral pattern when it begins to hear this music. In some cases, for example, the target animal that has been moving about extremely restlessly, or barking continuously, may somewhat relax, or start barking less frequently. In other cases, the target animal that has been napping may suddenly start moving actively, or start barking vigorously when the animal starts to hear this music. Moreover, there may be a target animal that hardly changes its behavioral pattern before and after the music is played.

The music providing system for a non-human animal not simply plays music remotely from a speaker, but estimates the behavioral state of the target animal by arithmetic processing and detects a degree of divergence from a target behavioral state even after the music has been played. The music information selecting unit carries out the process of selecting specific music information from a plurality of pieces of music information stored in the sound source storage unit until this degree of divergence becomes equal to or less than a predetermined first threshold.

Namely, if the behavioral state of a target animal "a" (current behavioral state) is far from a target behavioral state even after a piece of music M1 has been played to this target animal "a", the music information selecting unit selects another piece of music M2 and outputs the same from the speaker. The behavioral state of the target animal "a" (current behavioral state) is then checked again. This process is repeated until the behavioral state of the target animal "a" becomes closer to the target behavioral state, more particularly, until the degree of divergence becomes equal to or less than the predetermined first threshold.

Consequently, the music output from the speaker keeps changing automatically until a piece of music that has (had) some influence on the behavioral pattern of the target animal is found. Namely, an optimal piece of music is automatically selected in consideration of the specific nature (individual difference) of the target animal.

The music providing system for a non-human animal provides a significant effect even when the target animal is alone. Namely, suppose it has been confirmed before that a piece of music M2 showed an effect of calming down a target animal "a". This does not guarantee that the same effect will be realized when the same music M2 is played on another day. This is because, depending on the target animal, after having heard the same music a number of times, it is expected that the influence of the music being played on the behavioral pattern may diminish. This is an issue that can arise when the pet owner tries to calm down the target animal "a" remotely using a healing CD in which the music M2 is recorded.

On the other hand, assuming that the music M2 has been selected before and showed an effect of influencing the behavioral pattern, but when the same music M2, selected on another day, hardly influenced the behavioral pattern, according to the music providing system for a non-human animal, the music information selecting unit recognizes the degree of divergence of the current behavioral state from the target behavioral state being large, and changes the selected music (to music M3, for example). Consequently, the issue of the diminishing influence of the same music being played over and over again on the behavioral pattern of the same target animal will hardly arise.

The music providing system for a non-human animal is effective also when there are a plurality of target animals. For example, where there is a plurality of the target animals, the music information selecting unit may carry out a process of selecting a different piece of the specific music information until the degree of divergence regarding all of the target animals becomes equal to or less than the first threshold, or, until a total sum of the degrees of divergence of discrete ones of the target animals becomes equal to or less than a predetermined second threshold.

With this configuration, when there are a plurality of target animals, a piece of music that effectively influences the behavioral pattern of a majority of (e.g., over a half of) the target animals is selected automatically.

The music information selecting unit may simply extract a piece of the music information from a plurality of pieces of the music information stored in the sound source storage unit to select the specific music information, or, may perform a predetermined process after extracting the piece of the music information from the plurality of pieces of the music information stored in the sound source storage unit to select the specific music information. The "predetermined process" herein includes a process of changing elements such as tempo, frequency, tone color and the like (corresponding to the "feature parameters" to be described later). Note, such "predetermined process", if any, to be performed to the extracted music information to select the specific music information shall be made within the scope of laws so that no copyright issues will arise.

In the music providing system for a non-human animal,
the plurality of pieces of music information are stored in the sound source storage unit in association with coordinate information of coordinates in a feature space with feature parameter axes, and
when a degree of divergence of the current behavioral state of the target animal from the target behavioral state is detected for a first time, the music information selecting unit selects default music information corresponding to the coordinate information, with each of the preset feature parameters indicating a default value, in accordance with the target behavioral state as the specific music information.

According to the configuration described above, each of the plurality of pieces of music information stored in the sound source storage unit is classified for each of different feature parameters. Examples of the "feature parameters" referred to herein are elements such as tempo, frequency band, tone color, sound pressure, melody, harmony, rhythm, and so on and may include at least one of these elements.

Suppose, for example, the music information selecting unit has changed the music M2 that was being played immediately before to another music M3 based on the divergence of the current behavioral state of the target animal "a" from the target behavioral state. After that, the music information selecting unit recognizes the current behavioral state of the target animal "a" and checks the degree of divergence from the target behavioral state. In cases where the degree of divergence has decreased, i.e., the change of the music from M2 to M3 apparently has had some effect, the music information selecting unit recognizes, based on the relative positions of the coordinates in each feature space the music M2 belongs to and the coordinates in each feature space the music M3 belongs to, which feature parameters have acted effectively. For example, if it is found that the effect resulted from a change of tempo and frequency band in a predetermined direction, the music information selecting unit selects a piece of music M4 that is sorted to a coordinate position in the feature space in which tempo and frequency band have been changed in the predetermined direction from those of the music M3. This way, the processing time required for getting the behavioral state of the target animal to change to the target behavioral state can be shortened even more.

In the music providing system for a non-human animal,
the state information may include information relating to acceleration in a plurality of directions of the target animal, and
the state estimation processing unit may carry out a predetermined process including a process of integrating values based on the acceleration of the target animal over a predetermined period of time to calculate an index, and estimate the current behavioral state based on a ratio of the index to a specific index corresponding to a predetermined behavioral state.

The state information may include biological information of the target animal in addition to the information relating to the acceleration. The biological information may include electrocardiogram information, respiratory information, brain wave information, and so on. In cases where the state information includes the biological information, the state information acquisition unit may be a sensor that acquires the biological information, and this sensor may be installed on the target animal.

The music providing system for a non-human animal may be configured to include a server. More particularly, the music providing system for a non-human animal may be configured to further include a server that includes the state estimation processing unit, the target state storage unit, the sound source storage unit, the music information selecting unit, and the music information output unit, and the speaker provided within a region where the target animal is present, and when the server acquires the state information via wireless communication from the state information acquisition unit, which is configured to include a sensor provided in contact with the target animal, or configured to be capable of taking a picture of the target animal from a position away from the target animal, the server may output the state information to the state estimation processing unit, and when the music information selecting unit selects the specific music information, the server may output the specific music information to the speaker via wireless communication.

An acceleration sensor, for example, may be used as the sensor provided in contact with the target animal herein referred to. In this case, the sensor may be installed in direct contact with the target animal, or may be installed in an accessory attached to the target animal when in use such as collar or harness.

In the configuration described above, the server may include a setting information receiving unit, and when information relating to the target behavioral state is input via wireless communication from an operation terminal of a caretaker of the target animal, the setting information receiving unit may output the input information relating to the target behavioral state to the target state storage unit.

The configuration described above allows a caretaker (e.g., pet owner, or livestock keeper) to get the target animal to assume a desirable behavioral state (target behavioral state) automatically only by inputting the target behavioral state of the target animal from the operation terminal.

In the configuration described above, the server may include a behavioral state output unit that outputs information relating to the current behavioral state of the target animal to the operation terminal via wireless communication.

The configuration described above allows the caretaker to remotely know the behavioral state of the target animal at the current moment and thus allows the caretaker to check whether the system is operating correctly. It is also possible for the caretaker to give an instruction to stop the operation of this system at the time point when it is confirmed that the behavioral state of the target animal has reached the target behavioral state. Namely, the configuration described above can provide the criteria for determining whether or not this system is to be stopped.

In the configuration described above, the music information output unit may output at least one of the specific music information itself selected by the music information selecting unit and identification information for identifying the specific music information to the operation terminal via wireless communication.

In cases where the specific music information itself is output to the operation terminal, the caretaker can listen in real time to the very music being played to the target animal at the current moment. In cases where identification information for identifying the specific music information is output to the operation terminal, the caretaker can recognize in real time the information relating to the music being played to the target animal at the current moment. The caretaker is able to know what music is being played to the target animal from a remote location and can feel reassured in using this system.

The identification information may be, for example, the title, composer, arranger, singer and the like of the specific music information.

Effect of the Invention

The music providing system for a non-human animal of the present invention enables automated remote control of the behavioral state of non-human animals such as pets, livestock and the like using music.

MODE FOR CARRYING OUT THE INVENTION

First Embodiment

A first embodiment of a music providing system for a non-human animal according to the present invention will be described with reference to the drawings. This music providing system is used for the purpose of controlling the behavioral state of non-human animals such as pets, livestock, animals kept in zoos, rescued animals and the like, using music in an automated manner. The system is particularly applicable for the purpose of controlling the behavioral state of such non-human animals when the caretaker (for example, the owner of the pet, livestock keeper, workers in pet shops or pet hotels, breeders, etc.) is away from the location where the non-human animals are present.

Hereinafter, the "music providing system for a non-human animal" will sometimes be shortened to "music providing system" where appropriate.

Figure 1:
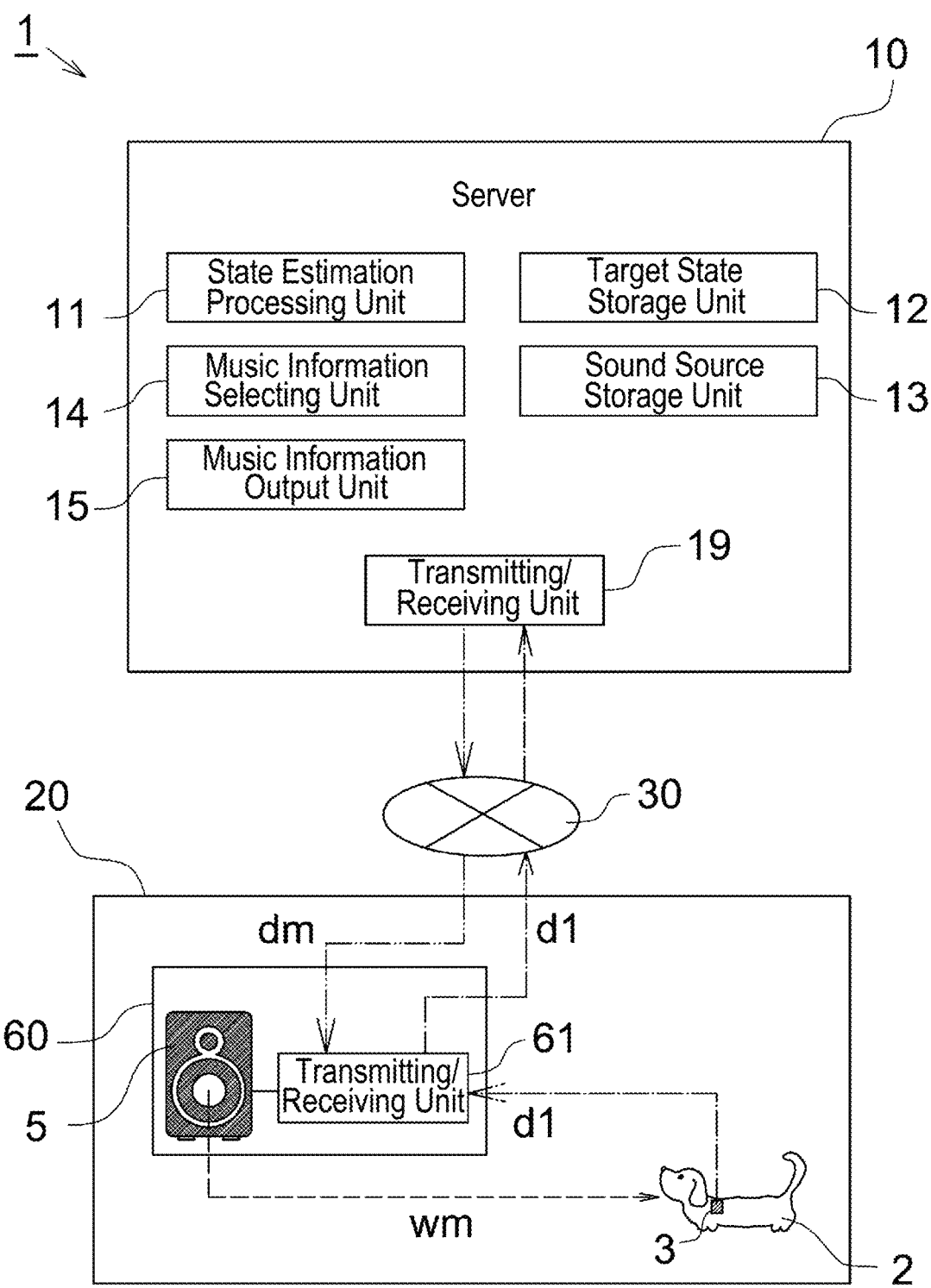
FIG. 1 is a schematic block diagram illustrating a configuration of a first embodiment of a music providing system for a non-human animal of the present invention.

FIG. 1 is a schematic block diagram illustrating a configuration of the first embodiment of the music providing system of the present invention. The music providing system 1 includes a server 10, a region of presence 20 of a target animal 2, and a communication line 30. In this embodiment, one example in which the target animal 2 is a dog will be described.

<Region of Presence 20>

The region of presence 20 of the target animal 2 is, in the case of the target animal 2 being an indoor dog, for example, a region where this indoor dog can move about. A speaker 5 is installed within this region of presence 20. This speaker 5 converts specific music information dm transmitted from the server 10 into sound energy and outputs an acoustic signal wm as will be described later. This speaker 5 may be installed anywhere as long as the acoustic signal wm output by the speaker 5 can be auditorily perceivable by the target animal 2.

FIG. 1 illustrates a case where the speaker 5 is built in a communication device 60 equipped with a transmitting/receiving unit 61. More particularly, FIG. 1 illustrates a case where the communication device 60 is a computer, and the speaker 5 is connected to this computer. The speaker 5 itself may be equipped with a communication function (transmitting/receiving unit 61), in which case the communication device 60 adopts a configuration wherein the transmitting/receiving unit 61 and the speaker 5 are united.

To the target animal 2 is attached a state information acquisition unit 3 that acquires state information relating to the motion state of this target animal 2. In this embodiment, the state information acquisition unit 3 is configured by an acceleration sensor. For example, the state information acquisition unit 3 is configured by a sensor capable of detecting acceleration of the motion in the directions of three axes, front-to-back, left and right, and up and down directions of the target animal 2 (hereinafter sometimes referred to as "X direction", "Y direction", and "Z direction", respectively). Additionally, the state information acquisition unit 3 may include an angular velocity sensor for rotational directions around the front-to-back axis, up and down axis, and left and right axis.

To attach the sensor such as an acceleration sensor to the target animal 2, the sensor may be directly installed on the skin of the target animal 2, or, installed in an accessory (such as collar or harness) attached to the target animal 2. Namely, the sensor may be attached in any manner as long as the motion state of the target animal 2 is detectable.

The state information acquisition unit 3 is configured to be capable of communication. In the example illustrated in FIG. 1, when the state information acquisition unit 3 acquires state information d1 relating to the motion state of this target animal 2, the unit 3 transmits this state information d1 to the communication device 60. The communication device 60 transmits this information to the server 10 via the communication line 30. In FIG. 1, the flow of the state information d1 is indicated as one-dot chain line. The communication schemes used for the communication between the state information acquisition unit 3 and the communication device 60 and between the communication device 60 and the server 10 (communication scheme adopted by the communication line 30) may be of any type. For example, Internet, Wi-Fi (registered trademark), Bluetooth (registered trademark) and the like may be used.

As will be described later with reference to FIG. 8, the state information acquisition unit 3 may alternatively adopt a configuration wherein the unit transmits the state information d1 directly to the server 10 without using the communication device 60. Hereinafter, the expression "the state information acquisition unit 3 transmits state information d1 to the server 10" shall include both cases where the state information acquisition unit 3 transmits state information d1 directly to the server 10 and where the state information acquisition unit 3 transmits the state information d1 to the server 10 via the communication device 60.

<Server 10>

As illustrated in FIG. 1, the server 10 includes a state estimation processing unit 11, a target state storage unit 12, a sound source storage unit 13, a music information selecting unit 14, a music information output unit 15, and a transmitting/receiving unit 19. The transmitting/receiving unit 19 is an interface for converting information into a predetermined transmittable/receivable mode for transmission and reception of the information between the server 10 and an external device via the communication line 30. The state estimation processing unit 11, music information selecting unit 14, and music information output unit 15 are arithmetic processing units that perform predetermined signal processing (arithmetic processing) based on acquired information, and configured by dedicated software and/or hardware. The target state storage unit 12 and sound source storage unit 13 are areas where predetermined information is stored, and configured by a storage medium such as a flash memory or a hard disk.

(State Estimation Processing Unit 11)

The state estimation processing unit 11 is processing means that estimates the behavioral state of the target animal 2 at the current moment (hereinafter referred to as "current behavioral state") by arithmetic processing based on the state information d1 relating to the motion state of the target animal 2 transmitted from the state information acquisition unit 3. A specific example of processing where the state information d1 is information relating to acceleration in the three-axis directions will be described.

Figure 2:
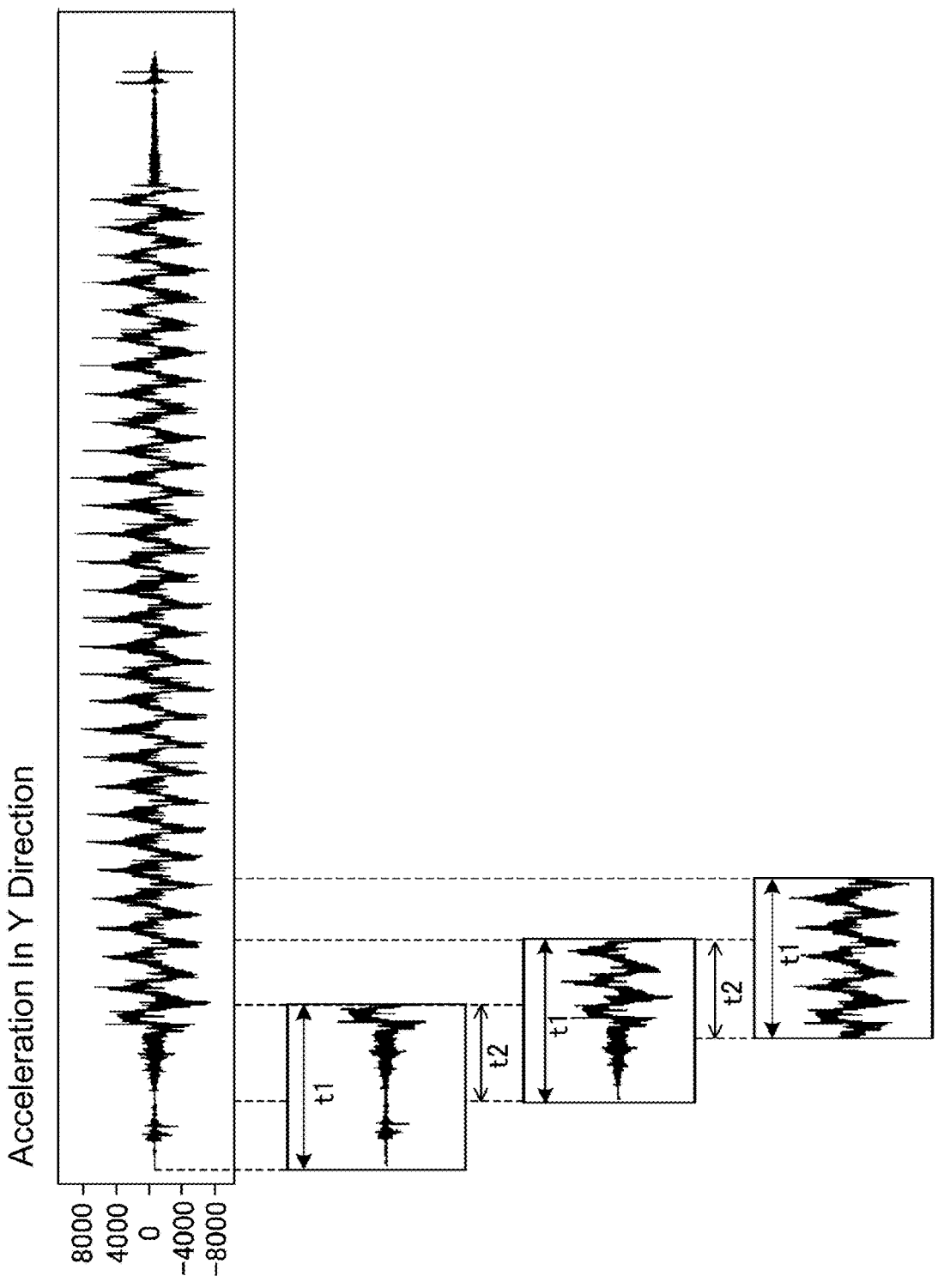
FIG. 2 is a drawing for describing the content of processing performed by a state estimation processing unit.

FIG. 2 is a schematic drawing of the change in the information of acceleration in the Y direction of the target animal 2 as one example of state information d1 transmitted from the state information acquisition unit 3. The values of acceleration in the X direction and Z direction undergo temporal changes similarly to those of the Y direction of FIG. 2.

The state estimation processing unit 11 cuts out segments of a predetermined period of time t1 each from the values of acceleration (ax, ay, az) regarding the X, Y, and Z direction that is the state information d1. This period of time t1 is 30 seconds, for example. FIG. 2 illustrates an example in which, when segments of a period of time t1 each are cut out, each segment is cut out such as to have a part overlapping, for a period of time t2, in the window of the segment cut out immediately before. This period of time t2 is 20 seconds, for example. The period of time t1 of cut-out segments and the period of time t2 of overlapping parts are merely examples.

The state estimation processing unit 11 extracts maximum and minimum values from the respective values of acceleration (ax, ay, az) within the period of time t1 of the cut-out segments for the process of estimating the intensity of movement of the target animal 2. Further, the state estimation processing unit integrates the respective values of acceleration (ax, ay, az) within the period of time t1 of the cut-out segments, and counts the numbers of local maxima and minima for the process of estimating the amount of activity in the movement of the target animal 2.

Further, the state estimation processing unit 11 performs an FFT (Fast Fourier Transform) process to the respective values of acceleration (ax, ay, az) to extract frequency characteristics regarding the movement of the target animal 2. When the target animal 2 is performing a repetitive action such as walking or running, the acceleration contains a characteristic frequency component, so that a behavioral pattern can be identified based on this frequency characteristic.

In performing each of the processes described above, the state estimation processing unit 11 may perform a cut-off process to the respective values of acceleration (ax, ay, az) that have been obtained, based on a judgment that values whose absolute values exceed a predetermined threshold derive from a noise signal. Moreover, for the similar purpose, the state estimation processing unit may perform each of the processes described above after passing the respective signals of acceleration (ax, ay, az) that have been obtained through a predetermined band pass filter.

In an alternative mode, if the respective accelerations (ax, ay, az) that have been obtained are data without base line correction, the state estimation processing unit 11 may compute the gravitational acceleration by decomposing each value of acceleration (ax, ay, az) into the gravitational component and other components, and estimate the inclination of the target animal 2 based on this computation results. From this estimation result, for example, the behavior of the target animal 2, such as whether it is about to crouch, lie down, or trying to get up, is estimated.

The state estimation processing unit 11 performs the processes illustrated above to estimate the behavioral state of the target animal 2 within the period of time t1 of the cut-out segment, and quantifies the estimation results based on predetermined rules.

The state estimation processing unit 11 repeats the processes described above over a period of time t3 (of, e.g., 5 minutes) to obtain number sequences that represent the quantified behavioral state of the target animal 2 within the period of time t3. An averaging process is performed to these number sequences, for example, so that the behavioral state of the target animal in the period of time t3 immediately before is represented as a number.

The state estimation processing unit 11 stores index values corresponding to specific behavioral states beforehand, such as an index value i0 representing the target animal 2 lying down completely and sleeping, and index value i1 representing the animal jumping on end. The state estimation processing unit 11 calculates the ratio of the stored index value corresponding to a specific behavioral state to the index value obtained by the arithmetic processing described above to estimate the behavioral state of the target animal 2 in the period of time t3 immediately before (current behavioral state). The "behavioral state" referred to herein may be evaluated by a calmness index, for example, which indicates how calm the target animal 2 is.

In the example described above, the process of estimating the behavioral state of the target animal 2 based on the respective obtained values of acceleration (ax, ay, az) for the period of time t1 each is repeated over the period of time t3. Instead, the behavioral state of the target animal 2 may be estimated by performing arithmetic processing collectively to the respective values of acceleration (ax, ay, az) obtained in the entire period of time t3.

Figure 3:
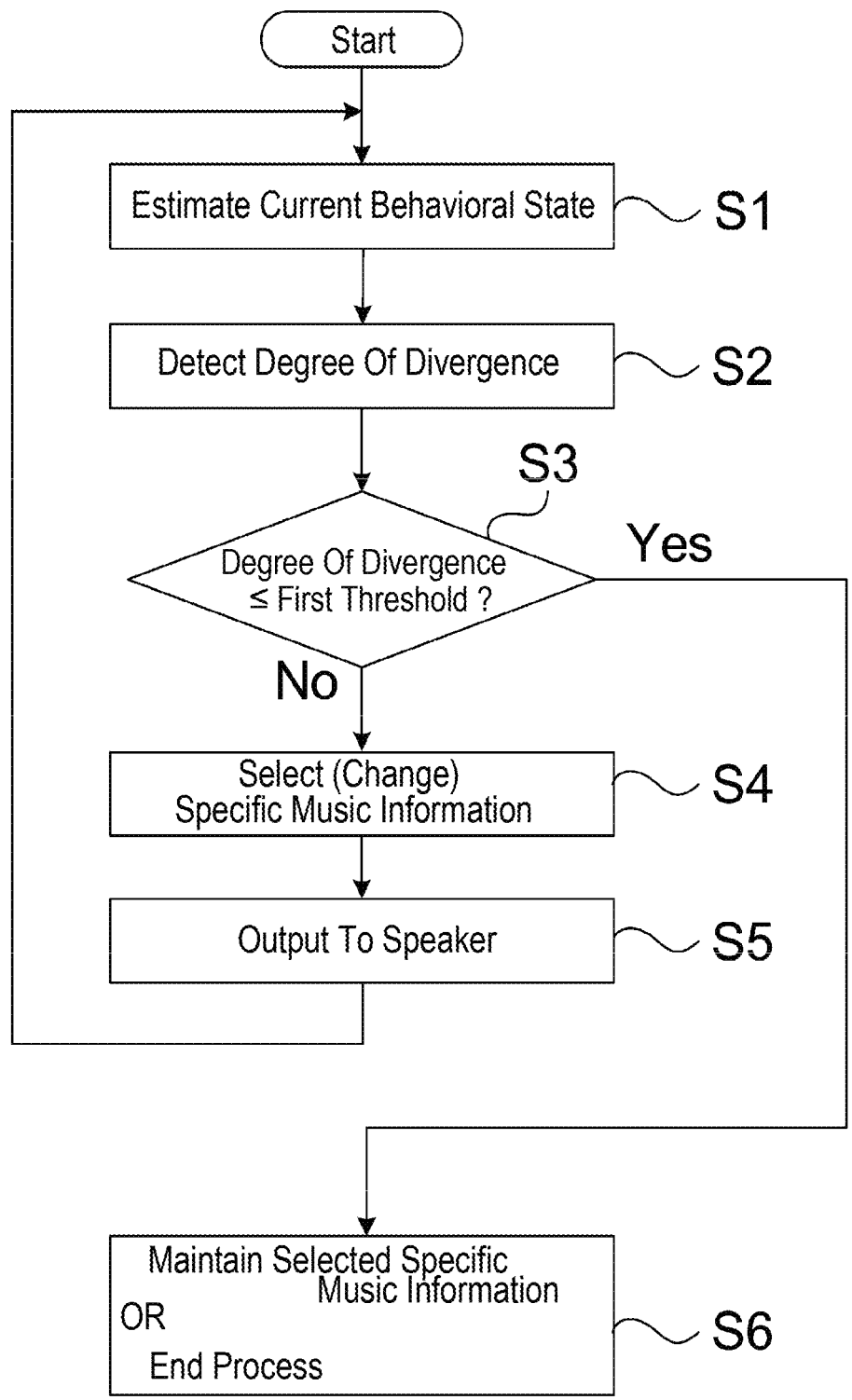
FIG. 3 is an example of a flowchart that illustrates a schematic overall process flow of the music providing system for a non-human animal of the present invention.

FIG. 3 is an example of a flowchart that illustrates a schematic overall process flow of the music providing system 1. The process performed by the state estimation processing unit 11 corresponds to step S1.

(Target State Storage Unit 12)

The target state storage unit 12 is storage means that stores behavioral states aimed to be achieved of the target animal 2 (hereinafter referred to as "target behavioral state"). The target behavioral state is the contents such as the target animal 2 being desired to be very calm, or the target animal 2 being desired to be excited, i.e., the behavioral state of the target animal 2 the pet owner (caretaker) of the target animal 2 desires. This target behavioral state may be set discretely by the caretaker, for example, or may be set automatically. In the latter case, the target behavioral state may be set to the content that is for making the target animal 2 very calm, for example.

Figure 4:
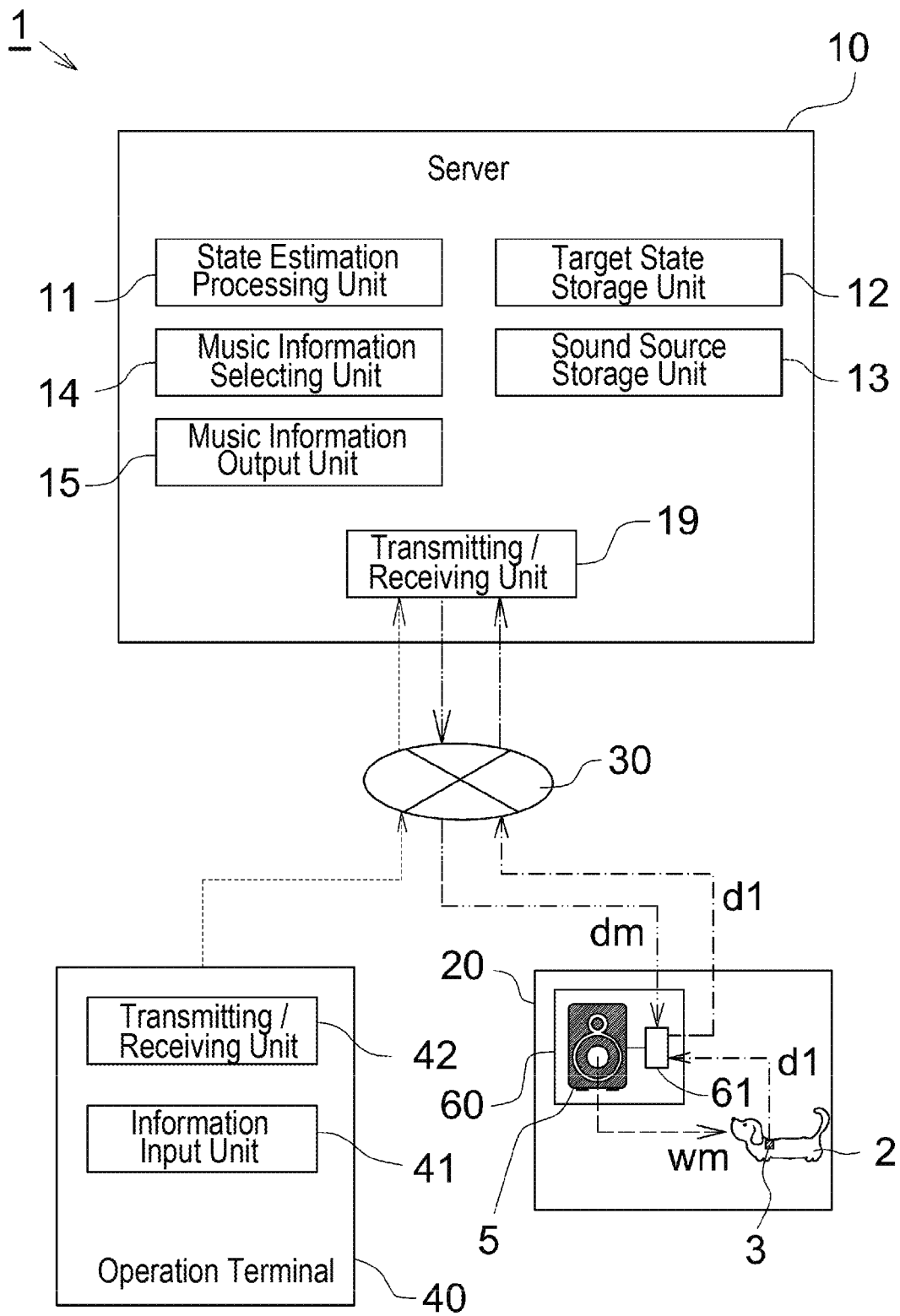
FIG. 4 is another schematic block diagram illustrating a configuration of the first embodiment of the music providing system for a non-human animal of the present invention.

As illustrated in FIG. 4, when the operation terminal 40 the caretaker owns is communicable with the server 10 via the communication line 30, the caretaker inputs information relating to the target behavioral state of the target animal 2 from an information input unit 41 of the operation terminal 40, and this information, by being transmitted by the transmitting/receiving unit 42 to the server 10, can be stored in the target state storage unit 12 of the server 10. Here, general-purpose communication equipment such as smartphones or tablet PCs may be used as the operation terminal 40. In this case, this general-purpose communication equipment may be configured to allow the information related to the target behavioral state to be input via a dedicated application installed therein.

A calmness index aimed to be achieved of the target animal 2, for example, may be adopted as the target behavioral state. A more particular example would be a 10-scale index, wherein the completely asleep state is Calmness 10, while the excited, constantly barking state is Calmness 1. In the case of the caretaker inputting from the operation terminal 40, for example, the application shows the behavioral state of the dog in multiple levels on the screen, and allows the caretaker to select a desired behavioral state, whereupon the calmness index corresponding to the behavioral state is output to the server 10 and can be stored in the target state storage unit 12.

(Sound Source Storage Unit 13, Music Information Selecting Unit 14)

The sound source storage unit 13 is storage means that stores a plurality of pieces of music information. The music information selecting unit 14 is processing means that compares the target behavioral state stored in the target state storage unit 12 described above and the current behavioral state of the target animal 2 estimated in the process of step S1 described above by the state estimation processing unit 11, and selects a piece of specific music information dm by arithmetic processing. The process performed by the music information selecting unit 14 corresponds to step S2 to step S4.

For example, in cases where both the target behavioral state and the current behavioral state are quantified based on the same index "calmness", the music information selecting unit 14 calculates the difference between both values to determine how far the behavioral state of the target animal at the current moment is from the target behavioral state. The index is not limited to the degree of calmness given above. The states may be quantified otherwise as long as the same index is used so that both states are comparable.

The music information selecting unit 14 detects the difference noted above as a "degree of divergence" (step S2), and compares this degree of divergence with a predetermined threshold (first threshold) (step S3). If the degree of divergence is not equal to or less than this threshold (No in step S3), the music information selecting unit 14 selects a piece of specific music information dm based on a plurality of pieces of music information stored in the sound source storage unit 13 by the method to be described later.

At this point, the specific music information dm is not selected yet. Therefore, the description in the following presupposes that the target animal 2 is showing a behavior that is largely deviated from the target behavioral state, i.e., that the degree of divergence exceeds the first threshold.

Figure 5:
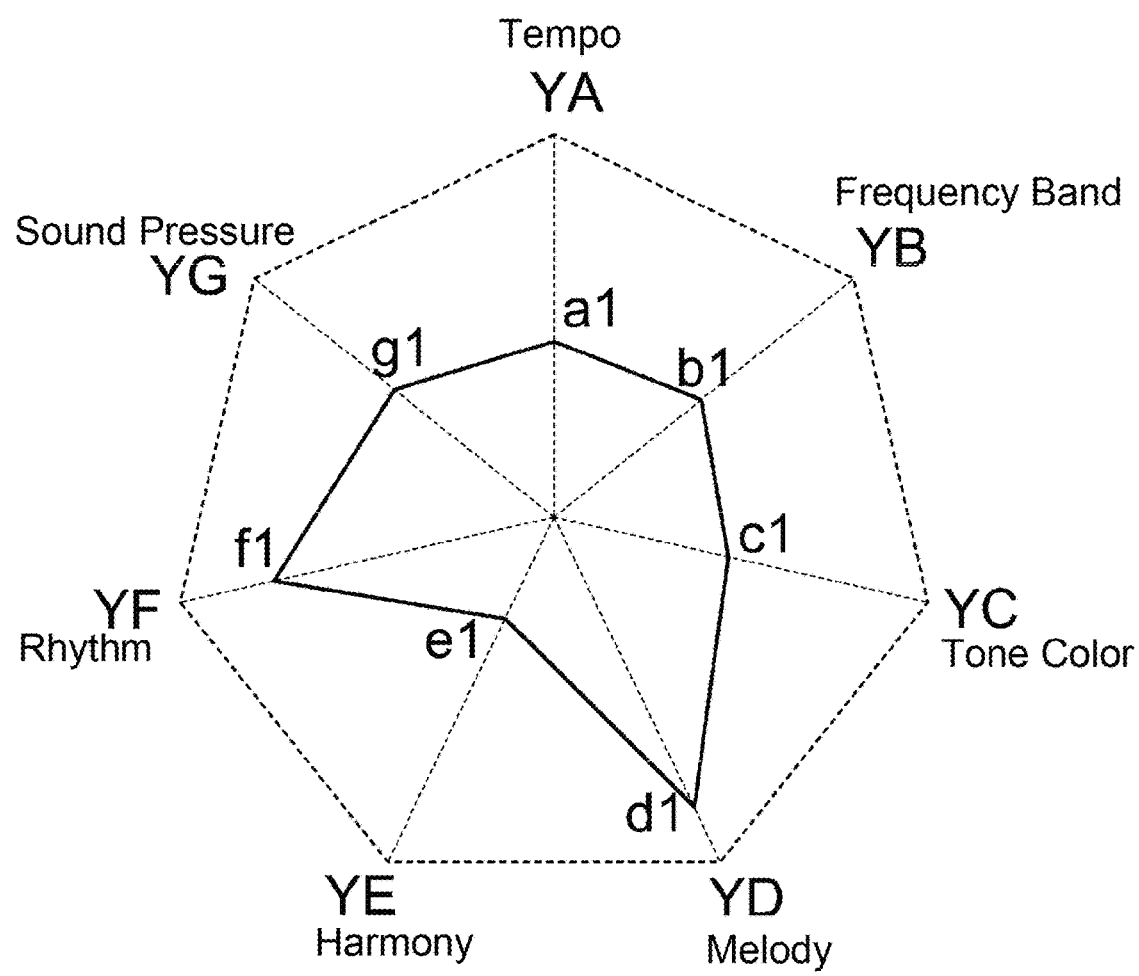
FIG. 5 is a schematic drawing for describing coordinate information of a piece of music.

In this embodiment, the sound source storage unit 13 stores a plurality of pieces of music information associated with coordinate information of coordinates in the feature space with different feature parameter axes. FIG. 5 is a schematic drawing for describing coordinate information of a piece of music.

In the example illustrated in FIG. 5, the music information is classified based on coordinates formed by evaluation values of seven types of feature parameters (tempo YA, frequency band YB, tone color YC, melody YD, harmony YE, rhythm YF, and sound pressure YG). Namely, in this example, the music information is each classified based on a coordinate position in the coordinate space of seven dimensions.

In the example illustrated in FIG. 5, the music information specified by music No. 0000001 has a value al on the tempo YA axis, a value b1 on the frequency band YB axis, a value c1 on the tone color YC axis, a value d1 on the melody YD axis, a value e1 on the harmony YE axis, a value f1 on the rhythm YF axis, and a value g1 on the sound pressure YG axis.

Here, the tempo YA axis corresponds to the speed of this music information. For the value on the YA axis, for example, the bpm value itself of this music information, or a value relative to a reference bpm, may be adopted.

The frequency band YB axis corresponds to the range between the minimum and maximum frequency values of this music information. For the value on the frequency band YB axis, for example, an intermediate value or a mean value of the minimum and maximum frequency values of this music information may be adopted.

The tone color YC axis corresponds to the distribution of frequencies and the varying state of frequencies of this music information. For the value on the tone color YC axis, for example, the frequency of appearance (duration of appearance) of each frequency is extracted, and a number of types of frequencies whose frequency of appearance exceeds ½ of the maximum frequency of appearance may be adopted.

The melody YD axis corresponds to the shape of a linear contour formed by connecting the sound pitches (sound heights). The value on the YD axis may be a value corresponding to a type of the shape that is the closest of a plurality of shapes classified beforehand.

The harmony YE axis corresponds to the continuity of vertical arrangement of notes. The value on the YE axis may be, for example, a value obtained by integrating the number of types of frequencies included in the sound information of different frequencies and overlapping at the same timing over a play time.

The rhythm YF axis corresponds to a series of sound durations. The value on the YF axis may be, for example, the periodicity of a spectrum.

The sound pressure YG axis corresponds to the volume of this music information. For the value on the YG axis, for example, the dB (decibel) value itself of this music information, or a value relative to a reference dB, may be adopted.

A plurality of pieces of music information are quantified for each of the seven feature parameters described above, and stored in the sound source storage unit 13 together with coordinate positions in the feature space.

The music information selecting unit 14 detects a degree of divergence of the target behavioral state stored in the target state storage unit 12 from the current behavioral state of the target animal 2, and selects a piece of specific music information dm from the plurality of pieces of music information stored in the sound source storage unit 13 based on the degree of divergence. In cases where the specific music information dm is to be selected first, the music information selecting unit 14 may select predefined music information (default music information) determined based on the content of the target behavioral state as the specific music information dm.

Namely, the music information selecting unit 14 holds therein previously stored default music information (more particularly, information that identifies this default music information) to be selected as default music in accordance with the type of the target behavioral state, so that default music information corresponding to the identification information can be read out from the sound source storage unit 13 and selected as the specific music information dm.

For example, in cases where the music that supposedly has some effect of calming down dogs generally (e.g., a music piece in commercially available healing CDs for dogs) is already known, such music may be set as the default music information.

(Music Information Output Unit 15, Transmitting/Receiving Unit 19)

The music information output unit 15 is processing means that reads out the specific music information dm selected by the music information selecting unit 14 in a playable format from the sound source storage unit 13 and outputs the same. The transmitting/receiving unit 19 converts the specific music information dm output from the music information output unit 15 into a mode transmittable via the communication line 30 and outputs the same to the speaker 5. This process corresponds to step S5.

The speaker 5 converts the specific music information din input from the server 10 into an acoustic signal wm and outputs the same. This acoustic signal win is auditorily perceived by the target animal 2.

<Feedback Loop>

When the target animal 2 recognizes the acoustic signal win originating from the specific music information dm, and when this music is one that has some psychological effect on the target animal 2, the target animal changes its behavioral pattern. On the other hand, if the music is one that has no special psychological effect, the target animal 2 is expected to hardly change its behavioral pattern.

The state information acquisition unit 3 keeps acquiring state information d1 relating to the motion state of the target animal 2 described in the foregoing with reference to FIG. 2 and transmits the information to the server 10 all the time during the output of the specific music information dm, i.e., during the time in which the target animal 2 is made to hear the acoustic signal wm output from the speaker 5. The state estimation processing unit 11 estimates the current behavioral state based on this state information d1 and outputs the results to the music information selecting unit 14 (step S1).

The music information selecting unit 14 calculates a degree of divergence of the current behavioral state output from the state estimation processing unit 11 from the target behavioral state stored in the target state storage unit 12 by the method described above (step S2), and compares the degree of divergence with the threshold (first threshold) (step S3). The degree of divergence being equal to or less than the first threshold (Yes in step S3) at this point corresponds to the behavioral state aimed to be achieved being substantially achieved as a result of the target animal 2 having been made to hear the acoustic signal wm based on the specific music information dm via the speaker 5 (step S5) and changed its behavioral state. Therefore, in this case, the music information selecting unit 14 carries out a process of maintaining the specific music information dm that has been selected immediately before (step S6). If, for example, the degree of divergence stays equal to or less than the first threshold over a predetermined period of time, then the music information selecting unit 14 may stop the selection of the specific music information dm. In this case, the state in which the speaker 5 keeps outputting the acoustic signal wm is stopped.

On the other hand, if the degree of divergence still exceeds the first threshold (No in step S3), it means that the behavioral state aimed to be achieved has not been achieved despite the target animal 2 having been made to hear the acoustic signal wm based on the specific music information dm. In this case, the music information selecting unit 14 carries out a process of changing the specific music information dm from the one that has been selected immediately before (step S4).

As a method of changing the specific music information dm, for example, a method of selecting specific music information dm2 having a largely different value of only one of the plurality of feature parameters described above in comparison to the specific music information dm1 selected immediately before may be adopted.

Alternatively, for example, a method of selecting specific music information dm3 having values of the plurality of feature parameters each different from that of the specific music information dm1 selected immediately before may be adopted.

The former method may be applied, for example, for evaluating the influence on the behavioral pattern of the target animal 2 of specific music information dm2 that is close to the specific music information dm1 in terms of the class and contents of music when some effect of bringing the behavioral state of the target animal 2 closer to the target behavioral state has been observed by selecting the specific music information dm1 immediately before while the effect was not sufficient. The latter method may be applied, for example, for evaluating the influence on the behavioral pattern of the target animal 2 of specific music information dm3 that is far from the specific music information dm1 in terms of the class and contents of music when hardly any effect of bringing the behavioral state of the target animal 2 closer to the target behavioral state has been observed by selecting the specific music information dm1 immediately before.

When the specific music information dm selected by the music information selecting unit 14 is changed, the specific music information dm after the change is output to the speaker 5 via the communication line 30 by the similar method as described above. Thus an acoustic signal wm different from the one immediately before is output from the speaker 5 and heard by the target animal 2.

From then onwards, steps S1 to S5 are repeated by the similar method until the degree of divergences becomes equal to or less than the first threshold. Namely, the music providing system 1 automatically changes the acoustic signals wm output from the speaker 5 until the target animal 2 shows a behavioral state aimed to be achieved. This allows for automatic control of the behavioral pattern of the target animal 2 in consideration of the individual characteristics of the target animal 2.

Figure 6:
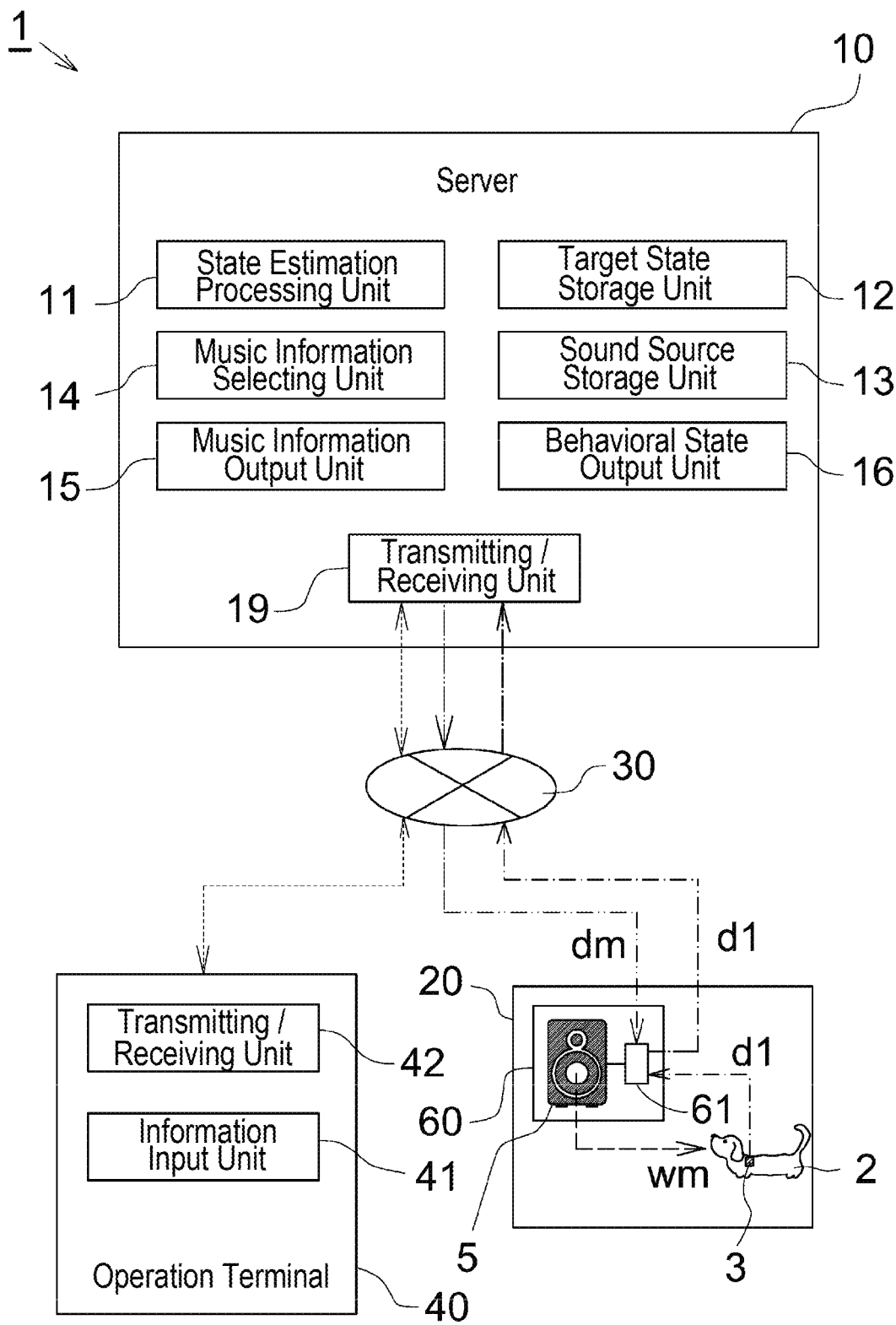
FIG. 6 is another schematic block diagram illustrating a configuration of the first embodiment of the music providing system for a non-human animal of the present invention.

The server 10 may include a behavioral state output unit 16 that outputs information regarding the current behavioral state of the target animal 2 as illustrated in FIG. 6. Based on the estimation results provided by the state estimation processing unit 11, this behavioral state output unit 16 changes the current behavioral state of the target animal 2 corresponding to the estimation results into a format the caretaker is able to recognize, for example, and outputs the same. This information is transmitted to the operation terminal 40 via the communication line 30. The caretaker can visually recognize the current state of the target animal 2 by checking the display part (not shown) of the operation terminal 40.

The server 10 may transmit the information relating to the selected specific music information dm to the operation terminal 40 via the communication line 30 during the time when the music information selecting unit 14 is selecting the specific music information dm. For example, the music information output unit 15 may read out the specific music information dm from the sound source storage unit 13 in a playable format and transmit the same to the speaker 5 and at the same time to the operation terminal 40, too. In this case, the caretaker can hear the same music from the operation terminal 40 simultaneously with the target animal 2. Alternatively, the music information output unit 15 may transmit only the information about the specific music information dm such as the title and composer (identification information) to the operation terminal 40 via the communication line 30. In this case, the caretaker can recognize which music the target animal 2 is hearing at the moment by letters or image information through the operation terminal 40.

Second Embodiment

Figure 7:
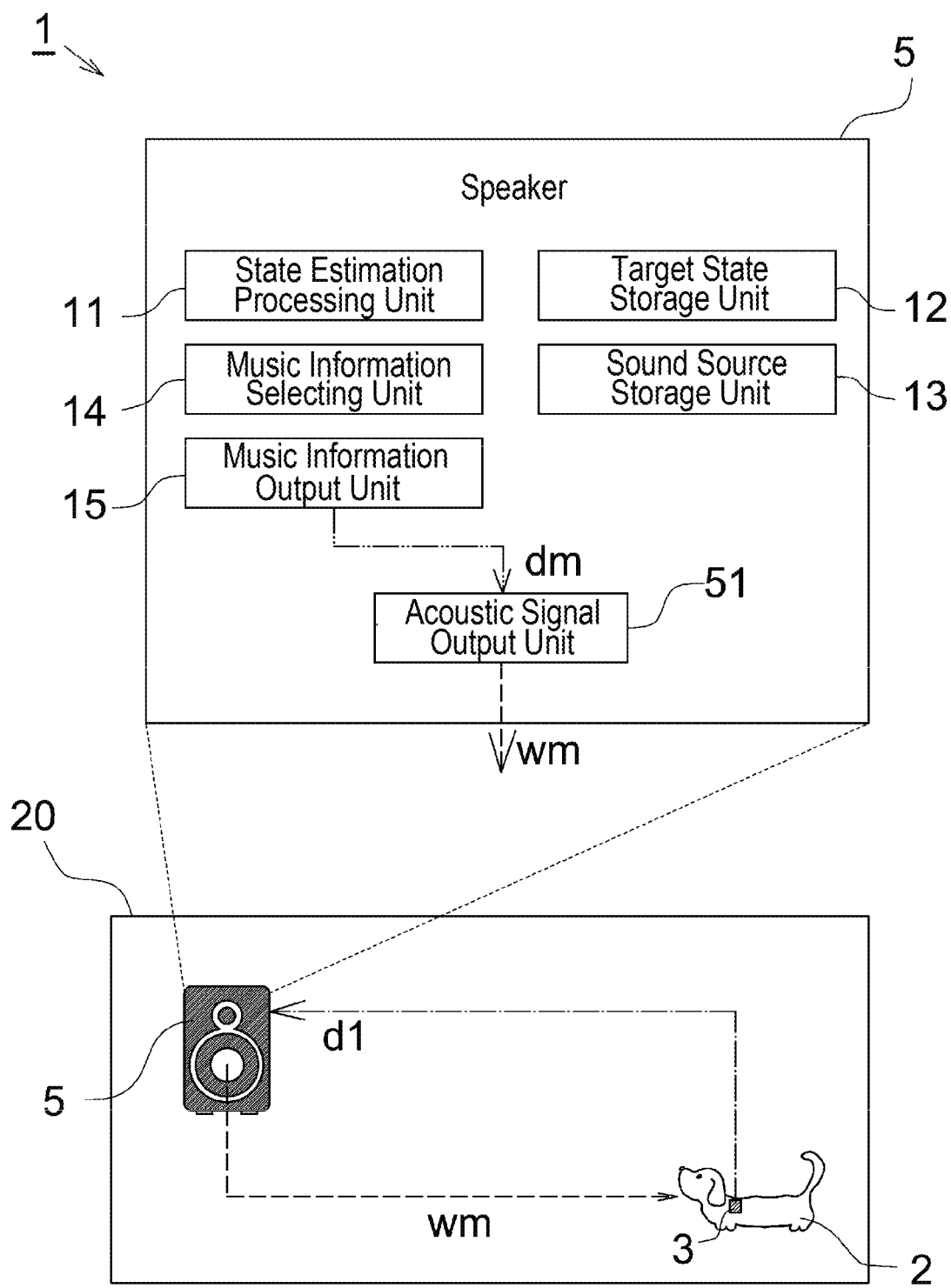
FIG. 7 is a schematic block diagram illustrating a configuration of a second embodiment of the music providing system for a non-human animal of the present invention.

FIG. 7 is a schematic block diagram illustrating a configuration of a second embodiment of the music providing system of the present invention. Below, only differences from the first embodiment will be described.

The music providing system 1 illustrated in FIG. 7 does not include the server 10, as compared to the music providing system 1 of the first embodiment. The functional means of the server 10 of the music providing system 1 of the first embodiment (state estimation processing unit 11, target state storage unit 12, sound source storage unit 13, music information selecting unit 14, and music information output unit 15) are each built in the speaker 5. The acoustic signal output unit 51 illustrated in FIG. 7 is functional means of outputting an acoustic signal which the speaker 5 inherently includes.

In this case, the state information d1 relating to the motion state of the target animal 2 obtained from the state information acquisition unit 3 is output to the speaker 5, and the speaker 5 carries out the various processing steps S1 to S6 described above.

While labelled as "speaker 5" for convenience in FIG. 7, this speaker 5 includes an acoustic system connected to the speaker 5 by a wired connection, or integrated with the speaker 5.

Other Embodiments

Other embodiments of the music providing system according to the present invention will be described below.

<1> While one case where the target animal 2 is a dog has been described in the embodiments above, the target animal 2 the music providing system 1 is intended for is not limited to dogs and may be other pet animals than dogs such as cats, rabbits, birds, etc., or livestock such as cows, horses, pigs, chickens, animals kept in zoos, or rescued animals.

<2> In the embodiments described above, one example is given where the music information stored in the sound source storage unit 13 is classified based on seven types of feature parameters. The number of types of feature parameters need not be seven. For example, there may be provided one type, or two types of feature parameters. The same goes with the classification method, i.e., each music information may be classified based on any musical elements including but not limited to the elements described above (tempo, frequency band, tone color, melody, harmony, rhythm, and sound pressure).

<3> In the embodiments described above, the music information selecting unit 14 simply extracts a piece of music information from a plurality of pieces of music information stored in the sound source storage unit 13 to select the specific music information dm in step S4. The method of selecting the specific music information dm is not limited to this. Namely, the specific music information dm may be the information obtained by the music information selecting unit 14 carrying out a process of changing the tempo, frequency, tone color and the like after extracting a piece of music information from the plurality of pieces of music information stored in the sound source storage unit 13. For example, in cases where the behavioral pattern of the target animal 2 became significantly closer to the target behavioral state by the specific music information din selected in step S4 immediately before, musical elements thereof may slightly be altered.

<4> The state information acquisition unit 3 described in the embodiments above acquires state information relating to the motion state (e.g., acceleration information) of the target animal 2. In addition to the motion state, information relating to a physiological state may be acquired. For example, the state information acquisition unit 3 may include a sensor that acquires information of at least one of pulses, brain waves, and an electrocardiogram of the target animal 2.

In this case, the state estimation processing unit 11 estimates the current behavioral state of the target animal 2 based on the state information d1 including information relating to a physiological state in addition to the motion state of the target animal 2 described above.

<5> In the embodiments described above, one example is given in which there is one target animal 2. The music providing system 1 can be applied to cases where a plurality of target animals 2 are present. While the following description presupposes that a common target behavioral state is set for all the target animals 2, similar arithmetic processing is possible even when different target behavioral states are discretely set for the target animals 2.

In this case, state information acquisition units 3 are set for discrete target animals 2 (2a, 2b, . . . ), and state information d1 (d1a, d1b, . . . ) acquired from each target animal 2 is output to the state estimation processor 11. The state estimation processor 11 estimates the current behavioral state of each target animal 2 (2a, 2b, . . . ) based on each state information d1.

The music information selecting unit 14 compares the target behavioral state stored in the target state storage unit 12 and the current behavioral state of each target animal 2 (2a, 2b, . . . ) estimated by the state estimation processing unit 11 and detects a degree of divergence. For example, the music information selecting unit 14 carries out a process of selecting (changing) the specific music information din for all the target animals 2 (2a, 2b, . . . ) if the degree of divergence a (aa, ab, . . . ) is not equal to or less than the first threshold. Alternatively, the music information selecting unit 14 carries out a process of selecting (changing) the specific music information dm if a total value of the degrees of divergence a (aa, ab, . . . ) regarding all the target animals 2 (2a, 2b, . . . ) is not equal to or less than a predetermined threshold (second threshold).

From then on, steps S1 to S5 are executed repeatedly similarly as described above. This way, a plurality of target animals 2 can be brought closer to a target behavioral state automatically.

Figure 8:
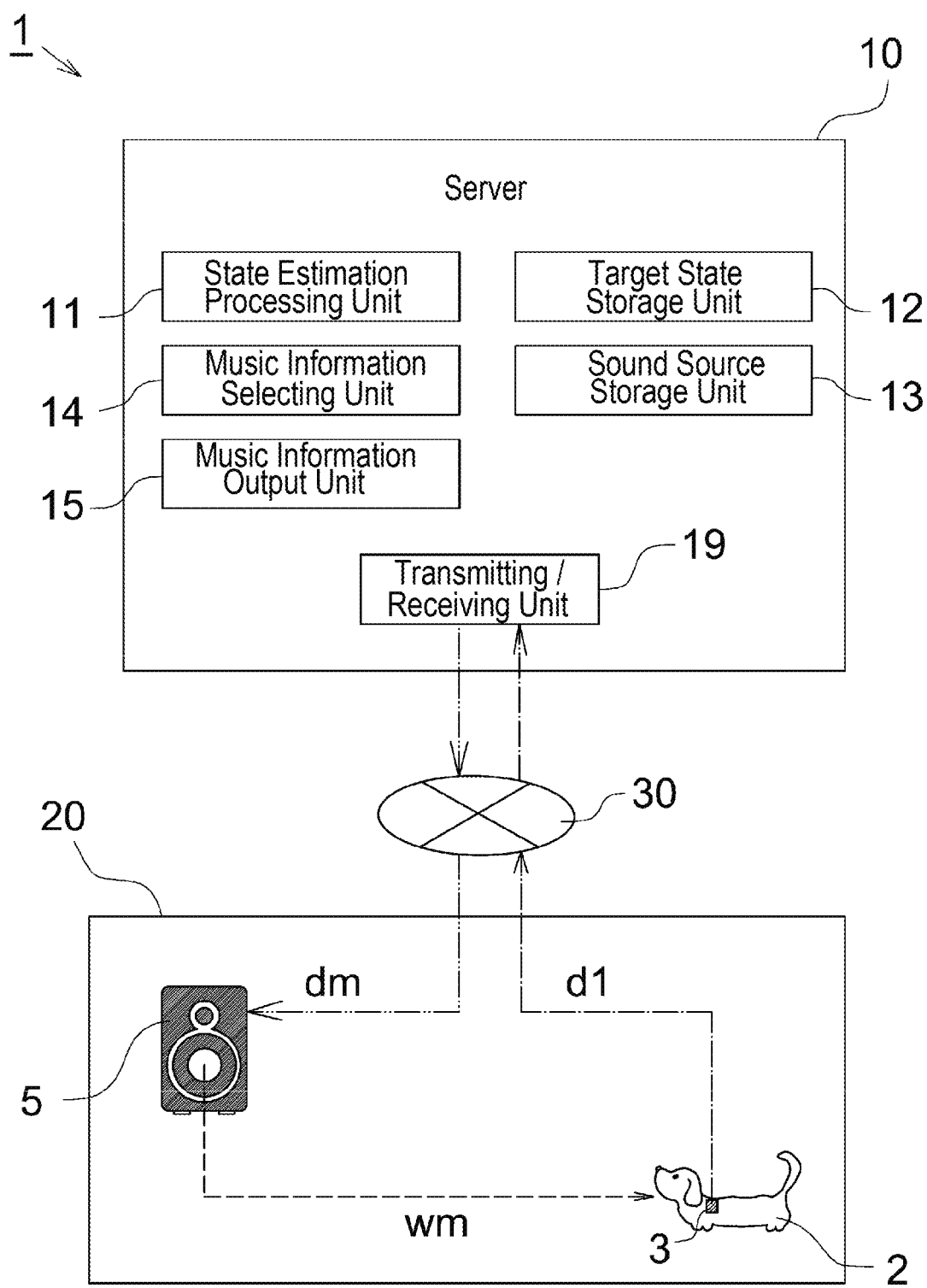
FIG. 8 is a schematic block diagram illustrating a configuration of another embodiment of the music providing system for a non-human animal of the present invention.

<6> As illustrated in FIG. 8, the state information acquisition unit 3 may be configured to be capable of communicating directly with the server 10 via the communication line 30. In this case, the state information acquisition unit 3 transmits the state information d1 directly to the server 10 without using the communication device 60.

<7> In the present invention, the music information stored in the sound source storage unit 13 may contain any sound information and is not limited to specific genres in the musical sense. For example, single tone sounds, natural sounds such as those of waves and winds, general living noises such as footsteps of the pet owner or clicking sounds of switches, or voices of humans including the pet owner among others, or of other animals, could also be used.

Figure 9:
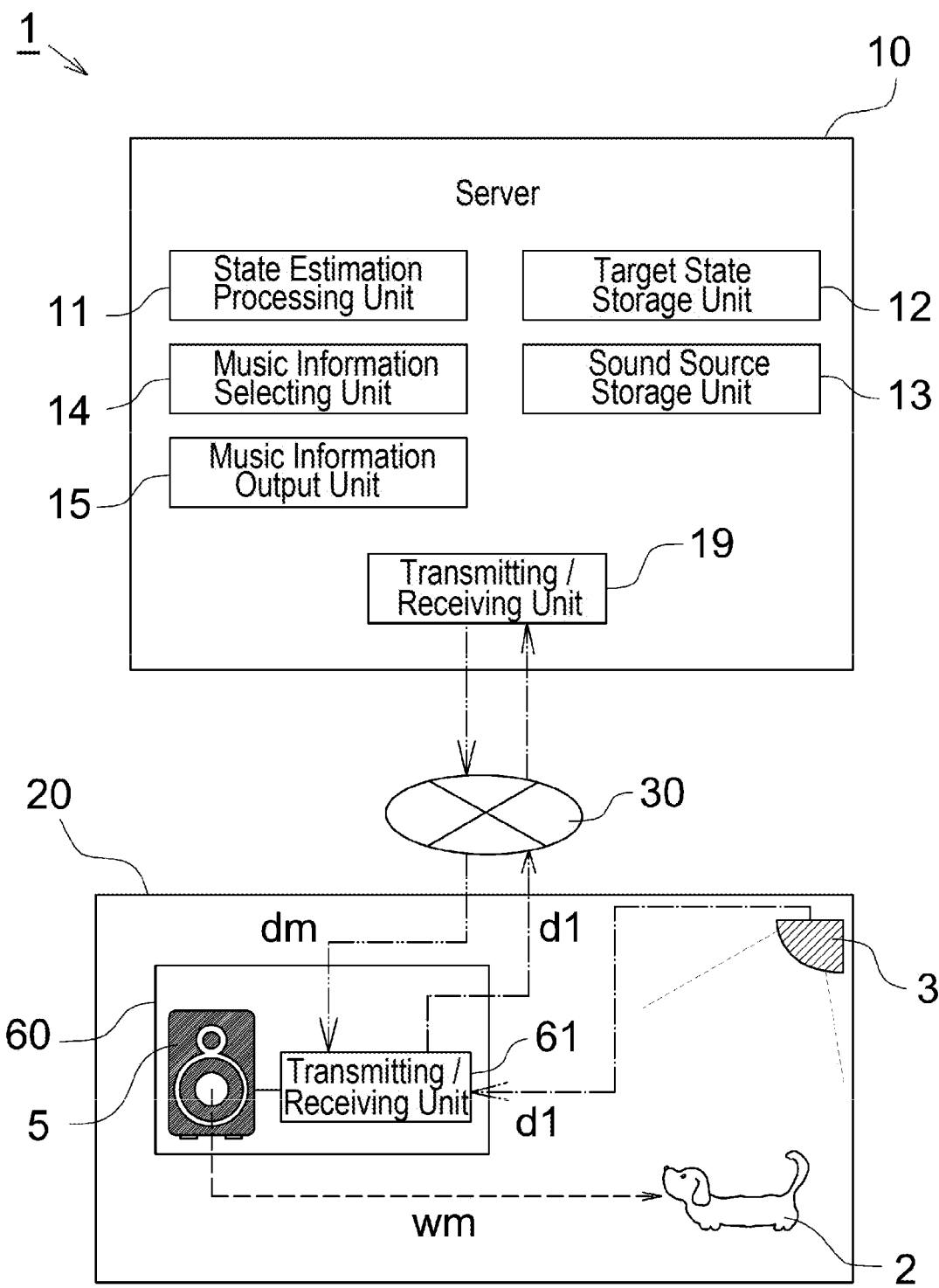
FIG. 9 is a schematic block diagram illustrating a configuration of another embodiment of the music providing system for a non-human animal of the present invention.

<8> In the embodiments described above, the state information acquisition unit 3 that is an acceleration sensor for example is attached to the target animal 2 so that the state information relating to the motion state of the target animal 2 is acquired. Instead, the state information acquisition unit 3 may be installed in a position away from the target animal 2, when acquiring the state information relating to the motion state of the target animal 2. FIG. 9 is a schematic illustration similar to FIG. 1 of an example in which the state information acquisition unit 3 is configured by a camera capable of taking pictures of inside of the region of presence 20 of the target animal 2.

In the music providing system 1 illustrated in FIG. 9, the state information acquisition unit 3 that is a camera transmits motion picture information of the target animal 2 to the server 10 directly or via the communication device 60 as the state information d1 relating to the motion state of the target animal 2. The state estimation processing unit 11 provided in the server 10 calculates the speed or acceleration in each direction of the target animal 2 by time-sharing analysis over a predetermined time of the state information d1 that is the motion picture information, and estimates the behavioral state of the target animal 2 by a method similar to that of the first embodiment described above, for example.

Another approach the state estimation processing unit 11 provided in the server 10 may adopt is to perform image analysis over a predetermined time of the state information d1 that is the motion picture information, to determine whether or not the target animal 2 is maintained in a specific state continuously over a specific period of time. More specifically, the state estimation processing unit 11 analyzes information such as whether or not the (face or body of the) target animal 2 is continuously at a distance of not more than a predetermined threshold from the ground of the region of presence 20, or whether the part of the target animal 2 being imaged by the state information acquisition unit 3 that is a camera is the belly side or the back side, and so on. Namely, the state estimation processing unit 11 provided in the server 10 may extract a duration of time that the target animal 2 has kept its state (posture) from the state info nation d1 that is motion picture information and estimate the behavioral state of the target animal 2. In this case, the state estimation processing unit 11 may contain, previously stored therein, behavioral states of the target animal 2, states (postures) of the target animal 7 and a specific duration of time as the basis of the determination.

<9> In the embodiments above, one case is described wherein the music providing system 1 is operated to get the target animal 2 to hear the specific music information dm that was automatically selected to bring the behavioral state of the target animal 2 closer to the target behavioral state when primarily the caretaker is absent from the region of presence 20 of the target animal 2. Instead, the music providing system 1 may be turned on when the caretaker is present inside the region of presence 20 of the target animal 2.

In this case, the state information acquisition unit 3 need not necessarily be configured to acquire the state information of the target animal 2 continuously. For example, the caretaker may bring the state information acquisition unit 3 that is an acceleration sensor or the like closer to the target animal 2 at any time to acquire the state information of the target animal. In this case, a smartphone that has a sensor function, or a handheld sensor, for example, may be used as the state information acquisition unit 3.

<10> The server 10 of the music providing system 1 may perform arithmetic processing based on state information d1 acquired from a plurality of types of state information acquisition units 3 to determine the specific music information dm. For example, the state information acquisition unit 3 that is an acceleration sensor attached to the target animal 2 as described with reference to FIG. 1, and the state information acquisition unit 3 that is a camera capable of taking images of inside of the region of presence 20 of the target animal 2 as described with reference to FIG. 9 may be used in combination.

A yet another example would be to install a state information acquisition unit 3 that is a mat with a built-in sensor function within the region of presence 20 of the target animal 2, to allow the state information d1 of the target animal 2 positioned on this mat to be transmitted to the server 10. In this case, the mat may include a sensor capable of detecting the weight for each coordinate position on the mat, and additionally, a built-in sensor that detects the heartbeat of the target animal 2 present on the mat.

<11> As illustrated in FIG. 4, when the operation terminal 40 the caretaker owns is communicable with the server 10 via the communication line 30, the operation terminal 40 may be configured to allow the caretaker to input information relating to attributes of the target animal 2 such as the type (e.g., dog type) or age of the target animal 2 from the information input unit 41 of the operation terminal 40.

Moreover, the music information selecting unit 14 in the server 10 may contain, previously stored therein, default music information for each attribute of target animals 2. In this case, default music information corresponding to the attribute of the target animal 2 transmitted from the operation terminal 40 is selected by the music information selecting unit 14, and output from the speaker 5. After that, each process of the steps S1 to S5 is repeatedly executed. Namely, this configuration can shorten the time required for getting the target animal 2 to assume the behavioral state aimed to be achieved, because default music information that supposedly has an effect of calming down for example is already stored for each attribute of the target animal 2.

The music information selecting unit 14 may update the stored default music information at any suitable time. When it is determined on the server 10 side that the degree of divergence of the current behavioral state of the target animal 2 from the target behavioral state is equal to or less than the first threshold (Yes in step S3), it is likely that the specific music information din being selected at this time point is also effective to another target animal 2 of the same attribute as that of this target animal 2. Therefore, the server 10 may store the specific music information dm that is being selected at the time point when the degree of divergence of the current behavioral state of the server 2 from the target behavioral state has become equal to or less than the first threshold in association with the information relating to the attributes of target animals 2 in the music information selecting unit 14. Furthermore, when the same specific music information dm has been associated with target animals 2 of the same attribute a predetermined number of times or more, the server 10 may update default music information corresponding to the target animal 2 having this attribute to this specific music information dm. This way, the time required for getting the target animal 2 to assume the behavioral state aimed to be achieved can be shortened even more.

Where the music providing system 1 does not include the server 10, as illustrated in FIG. 7, the system may be configured to allow the information processed in the speaker 5 to be transmitted to outside the music providing system 1 automatically or by the operation of the user for the purpose of allowing the system to learn music information that has some effect on the target animal 2 (default music information).

<12> In the embodiments described above, one example is given where the target behavioral state is the degree of calmness of the target animal 2. Instead, a state defined by the caretaker may be set as the "target behavioral state". For example, a "happy state" of the target animal 2 may be set as the target behavioral state. One example of this method is described below.

The caretaker keeps the music providing system 1 on when the caretaker is present inside the region of presence 20 with the target animal 2. Since the caretaker knows the target animal 2 much better than the music providing system 1 (server 10), the caretaker can understand whether or not the target animal 2 is enjoying itself. Therefore, at some point when the caretaker judges that the target animal 2 is enjoying itself, the caretaker stores this state as a "registered state" in the server 10. In one method whereby this can be achieved, for example, an operator that allows "registration of a state" may be displayed on the screen of the operation terminal 40, the associated information being transmitted to the server 10 when the caretaker operates this operator. The state of the target animal 2 at the current moment (here, "happy state") is stored in the server 10 at this point.

More particularly, in the server 10, a segment of the state information d1 of the target animal 2 over a predetermined period before and after the time point when information requesting "registration of a state" is transmitted from the operation terminal 40 is cut out and stored. After that, in the server 10, tendencies appearing in the cut-out segment of state information d1 are extracted, and the extracted tendencies are associated with the registered behavioral state. For example, when the behavioral state the caretaker wishes to register this time is a "happy state", the server 10 associates the information relating to the tendencies that appear in the cut-out segment of the state information d1 with the "happy state" of the target animal 2 and registers the same.

After the behavioral state defined by the caretaker has been thus defined on the side of the server 10, when the caretaker wishes to entertain the target animal 2 using the music providing system 1, the caretaker sets the target behavioral state to "happy state". Namely, the target state storage unit 12 stores the "happy state" as the behavioral state of the target animal 2 aimed to be achieved.

After that, processes similar to the steps S1 to S5 described above are performed, i.e., the music information selecting unit 14 carries out the process of selecting specific music information dm until the degree of divergence of the behavioral state of the target animal 2 at the current moment from the target behavioral state (happy state) becomes equal to or less than the first threshold.

The tendencies that appear in the state information d1 to be associated with the behavioral state defined by the caretaker in this way may be automatically learned by the server 10 for each attribute of the target animal 2. Namely, when each caretaker registers a behavioral state of the target animal 2 to the server 10, the caretaker registers an attribute of the target animal 2, too. The server 10 extracts and stores tendencies that appear in the state information d1 that indicates the same behavioral state that is the "happy state" for target animals 2 having the same attribute. This way, types of behavioral states the caretaker wishes to get the target animal 2 to assume by means of the music providing system 1 can be increased.

DESCRIPTION OF REFERENCE SIGNS

1 Music providing system
2 Target animal
3 State information acquisition unit
5 Speaker
10 Server
11 State estimation processing unit
12 Target state storage unit
13 Sound source storage unit
14 Music information selecting unit
15 Music information output unit
16 Behavioral state output unit
19 Transmitting/receiving unit
20 Region of presence of target animal
30 Communication line
40 Operation terminal
41 Information input unit
42 Transmitting/receiving unit
51 Acoustic signal output unit
60 Communication device
61 Transmitting/receiving unit
dm Specific music information
wm Acoustic signal

What is claimed is:

1. A music providing system for a non-human animal, comprising:
    a state information acquisition unit that acquires state information relating to a motion state of a target animal that is a non-human animal;
    a state estimation processor that estimates, from the state information, a current behavioral state that is a behavioral state of the target animal at a current moment by arithmetic processing;
    a target state storage that stores information relating to a target behavioral state that is a behavioral state aimed to be achieved of the target animal;
    a sound source storage that stores a plurality of pieces of music information;
    a music information selector that detects a degree of divergence of the current behavioral state from the target behavioral state by arithmetic processing, and selects a piece of specific music information based on the plurality of pieces of music information stored in the sound source storage by arithmetic processing; and
    a music information output unit that outputs the specific music information to a speaker provided within a region where the target animal is present via wireless or wired communication,
    wherein the music information selector carries out a process of selecting a different piece of the specific music information until the degree of divergence becomes equal to or less than a predetermined first threshold.

2. The music providing system for a non-human animal according to claim 1, wherein
    the plurality of pieces of music information are stored in the sound source storage in association with coordinate information of coordinates in a feature space with feature parameters by respective axes, and
    when a degree of divergence of the current behavioral state of the target animal from the target behavioral state is detected for a first time, the music information selector selects default music information corresponding to the coordinate information, with each of the feature parameters, which are preset and indicating a default value, in accordance with the target behavioral state as the specific music information.

3. The music providing system for a non-human animal according to claim 2, wherein, after selecting the default music information, until the degree of divergence becomes equal to or less than the first threshold, the music information selector repeats a process of selecting the specific music information having a different value of at least one of the feature parameters from that of the specific music information that was selected immediately before.

4. The music providing system for a non-human animal according to claim 2, wherein the feature parameters include at least one or more of a tempo, frequency band, tone color, melody, harmony, rhythm, and sound pressure of the music information.

5. The music providing system for a non-human animal according to claim 1, wherein
    the state information includes information relating to acceleration in multiple directions of the target animal, and
    the state estimation processor carries out a predetermined process including a process of integrating values based on the acceleration of the target animal over a predetermined period of time to calculate an index, and estimates the current behavioral state based on a ratio of the index to a specific index corresponding to a predetermined behavioral state.

6. The music providing system for a non-human animal according to claim 1, wherein, where there is a plurality of the target animals, the music information selector carries out a process of selecting a different piece of the specific music information until the degree of divergence regarding all of the target animals becomes equal to or less than the first threshold, or, until a total value of the degrees of divergence regarding discrete ones of the target animals becomes equal to or less than a predetermined second threshold.

7. The music providing system for a non-human animal according to claim 1, further comprising:
 a server that includes the state estimation processor, the target state storage, the sound source storage, the music information selector, and the music information output; and
 the speaker provided within a region where the target animal is present,
 wherein when the server acquires the state information via wireless communication from the state information acquisition unit, which is configured to include a sensor provided in contact with the target animal, or configured to be capable of taking a picture of the target animal from a position away from the target animal, the server outputs the state information to the state estimation processor, and
 when the music information selector selects the specific music information, the server outputs the specific music information to the speaker via wireless communication.

8. The music providing system for a non-human animal according to claim 7, wherein
 the server includes a setting information receiver, and
 when information relating to the target behavioral state is input via wireless communication from an operation terminal of a caretaker of the target animal, the setting information receiver outputs the input information relating to the target behavioral state to the target state storage.

9. The music providing system for a non-human animal according to claim 8, wherein the server includes a behavioral state output unit that outputs information regarding the current behavioral state of the target animal to the operation terminal via wireless communication.

10. The music providing system for a non-human animal according to claim 8, wherein the music information output unit outputs at least one of the specific music information itself selected by the music information selector and identification information for identifying the specific music information to the operation terminal via wireless communication.

* * * * *